US012357045B2

(12) United States Patent
Liu et al.

(10) Patent No.: US 12,357,045 B2
(45) Date of Patent: Jul. 15, 2025

(54) GLOVE SPRAYING APPARATUS AND SYSTEM, AND GLOVE

(71) Applicant: SHANDONG INTCO MEDICAL PRODUCTS CO., LTD, Qingzhou (CN)

(72) Inventors: Fangyi Liu, Qingzhou (CN); Ruijun Li, Qingzhou (CN); Mingwei Sun, Qingzhou (CN); Chunyu Chen, Qingzhou (CN); Fei Pan, Qingzhou (CN); Enjie He, Qingzhou (CN); Min Zhao, Huaibei (CN); Qiuying Dong, Qingzhou (CN)

(73) Assignee: SHANDONG INTCO MEDICAL PRODUCTS CO., LTD, Qingzhou (CN)

( * ) Notice: Subject to any disclaimer, the term of this patent is extended or adjusted under 35 U.S.C. 154(b) by 0 days.

(21) Appl. No.: 18/361,488

(22) Filed: Jul. 28, 2023

(65) Prior Publication Data

US 2025/0082054 A1 Mar. 13, 2025

(30) Foreign Application Priority Data

Jun. 20, 2023 (CN) ......................... 202321583367.1

(51) Int. Cl.
*A41D 19/04* (2006.01)
*B05B 14/00* (2018.01)

(52) U.S. Cl.
CPC .............. *A41D 19/04* (2013.01); *B05B 14/00* (2018.02)

(58) Field of Classification Search
CPC .. A41D 19/04; B05B 7/04; B05B 7/12; B05B 14/00; B05B 15/654
See application file for complete search history.

(56) References Cited

U.S. PATENT DOCUMENTS 3,329,548 A * 7/1967 Blatz ...................... A41D 19/04 206/390
4,918,754 A * 4/1990 Leatherman ........ B29C 66/8322 2/167

(Continued)

FOREIGN PATENT DOCUMENTS

CN 106268113 A * 1/2017 ............. B01D 47/06
CN 109588096 A * 4/2019 ............. A01C 23/04

(Continued)

OTHER PUBLICATIONS

Amazon, "Bathroom 304 Stainless Steel Into Wall and Cold Double Hold Sink Universal Pipe Shower Rotary Kitchen Faucet Faucets" pp. 1-4, available at www.amazon.com, last accessed Nov. 26, 2024.

*Primary Examiner* — Shaun R Hurley
(74) *Attorney, Agent, or Firm* — EVENTIDE LAW LLC

(57) ABSTRACT

A glove spraying apparatus and system, and a glove are disclosed. The glove spraying apparatus includes a first liquid container, a plurality of universal pipelines, and a plurality of nozzles. The first liquid container communicates with first ends of the universal pipelines through pipelines; the nozzles are fluidly connected to second ends of the universal pipelines. By mounting the nozzles at the second ends of the universal pipelines and communicating with the universal pipelines, the user may adjust the positions and orientations of the nozzles by means of the universal pipelines, thereby enabling spraying for different portions of the glove.

16 Claims, 3 Drawing Sheets

(56) References Cited

U.S. PATENT DOCUMENTS

| | | | | |
|---|---|---|---|---|
| 10,092,047 | B2 | 10/2018 | Wong et al. | |
| 10,632,480 | B2 | 4/2020 | Yu | |
| 2006/0258279 | A1 * | 11/2006 | Bonnard | A61L 2/26 454/55 |
| 2008/0072927 | A1 * | 3/2008 | Weiss | C11D 3/30 134/198 |
| 2008/0087306 | A1 * | 4/2008 | Kim | B08B 3/006 134/95.2 |
| 2017/0013849 | A1 * | 1/2017 | Thippareddi | A23B 5/015 |
| 2020/0253304 | A1 | 8/2020 | Cornelissen et al. | |

FOREIGN PATENT DOCUMENTS

| | | | | |
|---|---|---|---|---|
| CN | 213961972 | U | | 8/2021 |
| CN | 218690728 | U | | 3/2023 |
| CN | 218960132 | U | | 5/2023 |
| KR | 20110060461 | A | * | 6/2011 |

* cited by examiner

GLOVE SPRAYING APPARATUS AND SYSTEM, AND GLOVE

CROSS-REFERENCE TO RELATED APPLICATIONS

The present application claims priority to Chinese patent application No. 202321583367.1, filed on Jun. 20, 2023, and entitled "Glove Spraying Apparatus And System, And Glove," which is incorporated herein by reference.

FIELD

The present disclosure relates to the technical field of glove production, and in particular to a glove spraying apparatus and system, and a glove.

BACKGROUND

Disposable butyronitrile gloves (hereinafter referred to "gloves") are widely used in various industries, such as the food processing industry, household cleaning, medical industry, hairdressing and hair dyeing, laboratory, engineering, and precision instrument assembly. With the continuous growing of application range and the user group of disposable gloves, users put forward new requirements for gloves in addition to the functional requirements of protective barriers, such as ease of wearing, skincare, and fragrance. These new requirements often need to be achieved by adding or adjusting the glove coating.

The traditional glove coating process adopts a material tank impregnation method, requiring large amounts of stock solution reserves of several square meters and needing to prepare a material tank of stock solution before starting production. The stock solution has poor circulation and fluidity in the material tank, and needs continuous feeding to keep the liquid level at a high level. After the completion of use, all the remaining stock solution in the material tank needs to be discharged, resulting in great waste; at the same time, the material tank is in a high-temperature environment, accelerating the spoilage and deterioration of the stock solution. Thus, the prior art has prepared glove coatings by glove spraying.

However, as the applicant knows, the existing spraying preparation apparatus for glove coating only sprays all the portions of the glove or only sprays specific portions of the glove, which cannot meet the requirements of various situations.

SUMMARY

In order to overcome at least one of the deficiencies of the prior art, an object of the present disclosure is to provide a glove spraying apparatus and system capable of adjusting spraying positions.

The present disclosure further provides a glove whose interior surface is not completely covered by a single coating.

In a first aspect, the present disclosure provides a glove spraying apparatus, including a first liquid container, universal pipelines, and nozzles; the first liquid container communicates with first ends of the universal pipelines; the nozzles are fluidly connected to respective second ends of the universal pipelines.

Optionally, the first ends of the universal pipelines are provided with flow regulating valves each having a liquid inlet, a gas inlet, and a regulating valve outlet; the gas inlet is configured to inhale gas, the liquid inlet communicates with the first liquid container, and the regulating valve outlet communicates with the universal pipelines; the gas and spraying liquid are mixed in the flow regulating valves, and the flow regulating valves are used for adjusting flows of the spraying liquid and the gas.

Optionally, recycling containers are provided; the recycling containers are located under or beneath the nozzles to recycle the spraying liquid, and configured to communicate with the first liquid container.

Optionally, the first liquid container is provided with a first filter for filtering spraying liquid in the first liquid container.

Optionally, a second liquid container and a pump body are provided, the pump body transfers spraying liquid in the second liquid container to the first liquid container.

Optionally, temperature of the spraying liquid in the second liquid container is 30° C. or less.

Optionally, the nozzles are atomizing nozzles.

Optionally, a plurality of universal pipelines and a plurality of nozzles are provided; a number of the plurality of nozzles corresponds to a number of the second ends of the plurality of universal pipelines.

Optionally, the plurality of universal pipelines include Y-shaped universal pipelines and linear universal pipelines.

Each of the Y-shaped universal pipelines includes one of the first ends and two of the second ends; the first end of each of the Y-shaped universal pipelines communicates with the first liquid container, and each of the two second ends of each of the Y-shaped universal pipelines communicates with the nozzles, respectively.

Each of the linear universal pipelines includes one of the first ends and one of the second ends; the first end of each of the linear universal pipelines communicates with the first liquid container, and the second end of each of the linear universal pipelines communicates with one of the nozzles.

In a second aspect, the present disclosure provides a glove spraying system, including at least one glove mold and the glove spraying apparatus for spraying a glove on the at least one glove mold.

Optionally, the nozzles include first nozzles for spraying a front side of the glove on the at least one glove mold and second nozzles for spraying a back side of the glove on the at least one glove mold.

Optionally, the at least one glove mold is arranged in sets, each set of the at least one glove mold is arranged in parallel, and adjacent sets are in a splayed arrangement.

In a third aspect, the present disclosure provides a glove spraying apparatus, including a first liquid container, nozzles, recycling containers, and a first filter; the first liquid container communicates with the nozzles; the recycling containers are located under or beneath the nozzles to recycle spraying liquid, and the recycling containers communicate with the first liquid container; and the first liquid container is provided with the first filter for filtering spraying liquid in the first liquid container.

Optionally, flow regulating valves are provided between the first liquid container and the nozzles; each of the flow regulating valves has a liquid inlet, a gas inlet, and a regulating valve outlet; the gas inlet is configured to inhale gas, the liquid inlet communicates with the first liquid container, and the regulating valve outlet communicates with the universal pipelines; the gas and spraying liquid are mixed in the flow regulating valves, and the flow regulating valves are used for adjusting flows of the spraying liquid and the gas.

Optionally, a second liquid container and a pump body are provided; the pump body transfers spraying liquid in the second liquid container to the first liquid container.

Optionally, temperature of the spraying liquid in the second liquid container is 30° C. or less.

Optionally, the nozzles are atomizing nozzles.

In a fourth aspect, the present disclosure provides a glove spraying system, including at least one glove mold and the glove spraying apparatus for spraying a glove on the at least one glove mold.

Optionally, the nozzles include first nozzles for spraying a front side of the glove on the at least one glove mold and second nozzles for spraying a back side of the glove on the at least one glove mold.

Optionally, the at least one glove mold is arranged in sets, each set of the at least one glove mold is arranged in parallel, and adjacent sets are in a splayed arrangement.

In a fifth aspect, the present disclosure provides a glove; a first coating is formed on the glove, the first coating does not completely cover an interior surface of the glove.

Optionally, a second coating is formed on the glove; the second coating is disposed on a region of the interior surface of the glove not covered by the first coating.

The technical solutions provided by the embodiments of the first and second aspects may include the following advantages: in the above arrangement, the nozzles are fluidly connected to the second ends of the universal pipelines, so that a user can adjust the positions and orientations of the nozzles through the universal pipelines, thereby spraying on various portions of the glove.

The technical solutions provided by the embodiments of the third and fourth aspects may include the following advantages: the sprayed spraying liquid is collected through recycling containers before being filtered by a first filter, to improve the utilization rate of the spraying liquid while ensuring the purity of the recycled spraying liquid, thereby greatly reducing the production cost.

For the technical solutions provided by the embodiment of the fifth aspect, it is possible to provide only the first coating layer at a specific portion according to the requirements of different users, to reduce waste while strengthening targeted effects.

Figure 1:
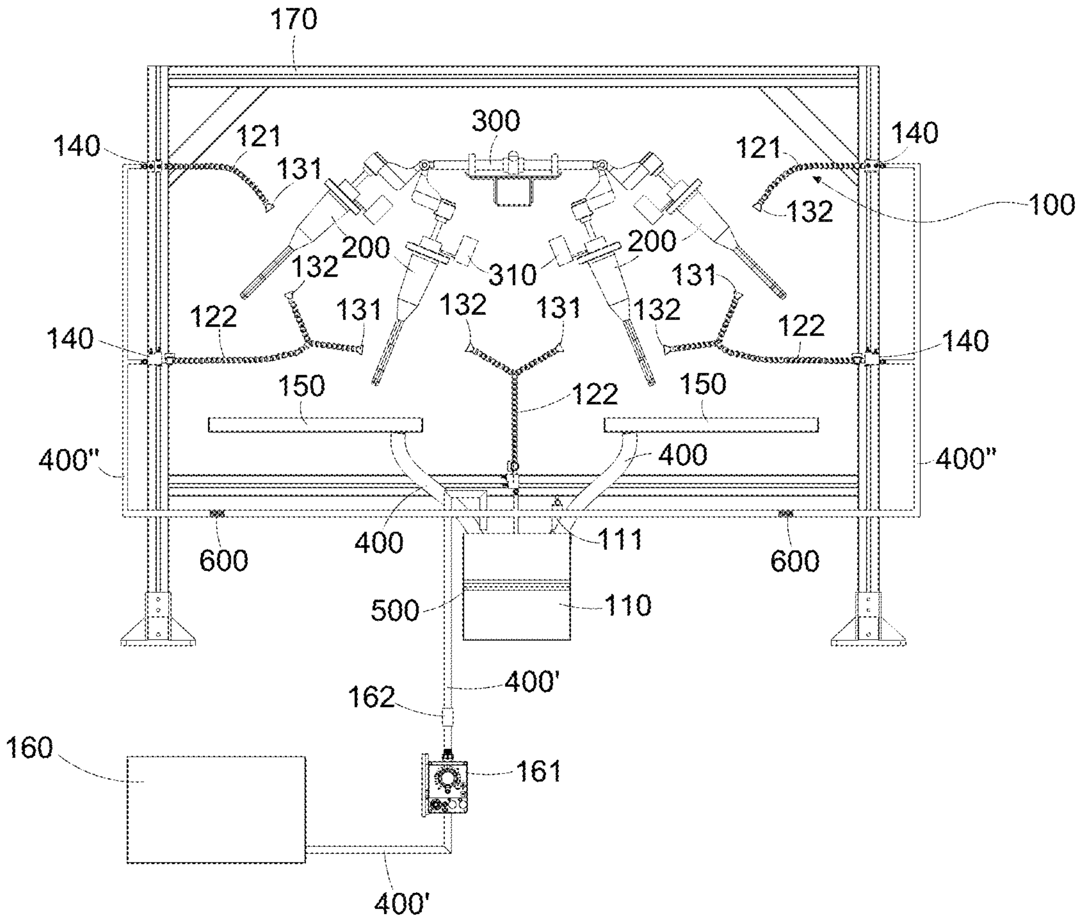
FIG. 1 is a structural diagram of a glove spraying system in one embodiment of the present disclosure.

The reference numeral list is as follows:

100, glove spraying apparatus; 110, first liquid container; 111, liquid level sensor; 121, linear universal pipeline; 121A, first end of the linear universal pipeline; 121B, second end of the linear universal pipeline; 122, Y-shaped universal pipeline; 122A, first end of the Y-shaped universal pipeline; 122B, second end of the Y-shaped universal pipeline; 131, first nozzle; 132, second nozzle; 140, flow regulating valve; 141, liquid inlet; 142, gas inlet; 143, regulating valve outlet; 144, regulating screw; 150, recycling container; 160, second liquid container; 161, pump body; 162, valve; 170, mounting bracket; 200, glove mold; 300, mold bracket; 310, spacing bar; 400, pipeline; 400', pipeline; 400", pipeline; 500, first filter; 600, second filter; 700, glove; 710, first coating; and 720, second coating.

DETAILED DESCRIPTION

For better understanding and implementation, the technical solutions in the embodiments of the present disclosure are clearly and completely described below in conjunction with the drawings in the embodiments of the present disclosure.

In describing the present disclosure, it should be noted that the terms "upper," "lower," "front," "back," "left," "right," "vertical," "horizontal," "top," "bottom," "inner," "outer," "distal," "proximal," and the like indicate orientations or spatial relationships based on the orientations or spatial relationships shown in the drawings, merely to facilitate description of the present disclosure and simplify the description, and do not indicate or imply that the discussed apparatuses or elements must have particular orientations, be constructed and operated in particular orientations, and thus should not be construed as limiting the present disclosure. Specifically, as used herein, "distal end" refers to an orientation away from the operator, and "proximal end" refers to an orientation close to the operator.

Unless defined otherwise, all technical and scientific terms used herein have the same meaning as commonly understood by the ordinarily skilled in the art to which the present disclosure pertains. The terms used herein are for the purpose of describing specific embodiments only and are not intended to limit to the present disclosure.

Figure 2:
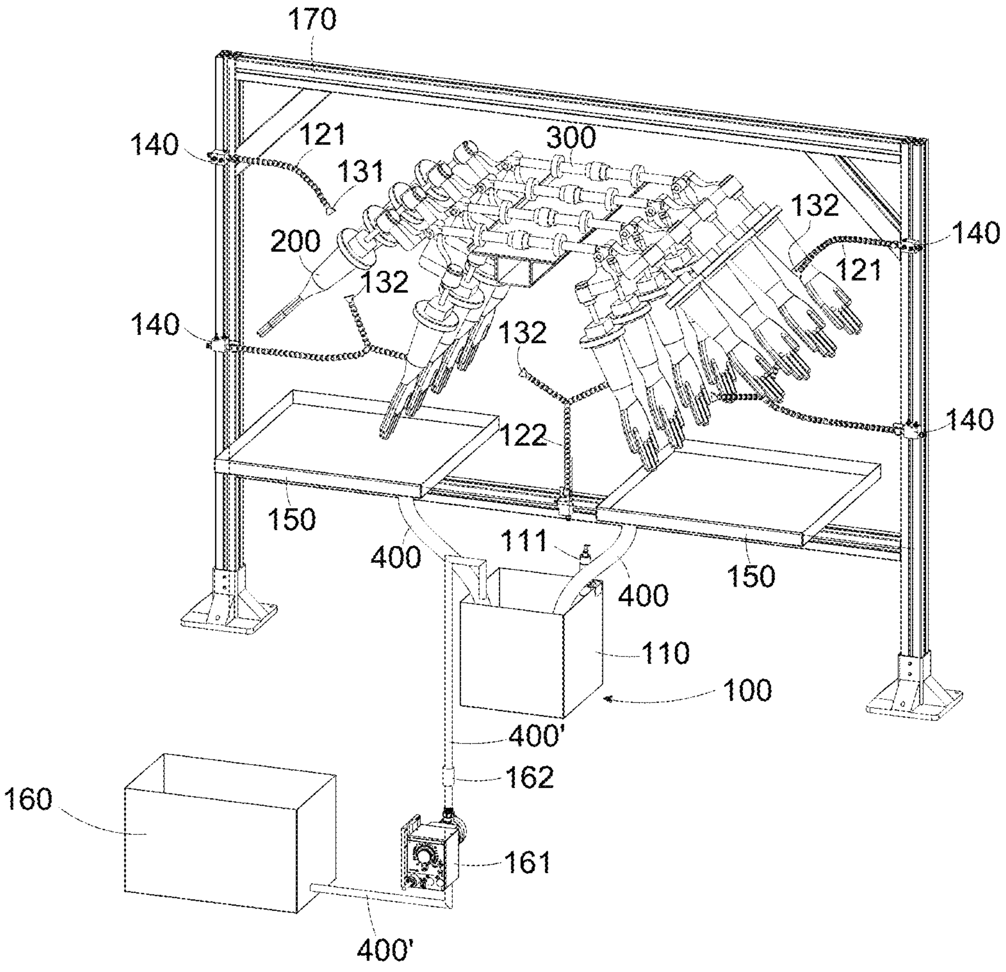
FIG. 2 is a partially structural diagram of a glove spraying system in FIG. 1 at another perspective.
Figure 3:
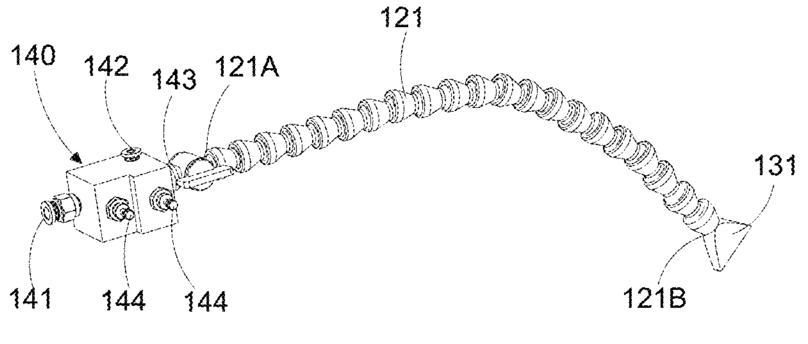
FIG. 3 is a diagram of a combined structure of a linear universal pipeline, a flow regulating valve, and a nozzle.
Figure 4:
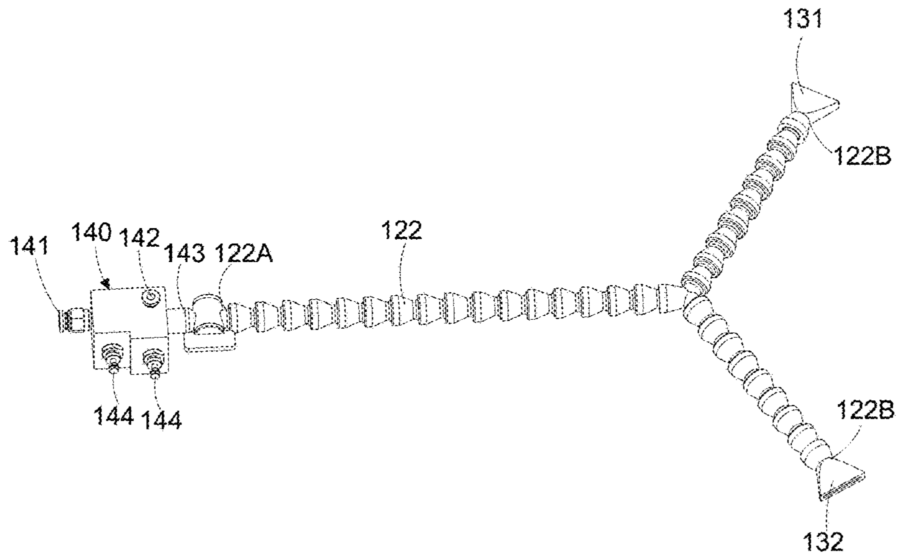
FIG. 4 is a diagram of a combined structure of a Y-shaped universal pipeline, a flow regulating valve, and a nozzle.
Figure 5:
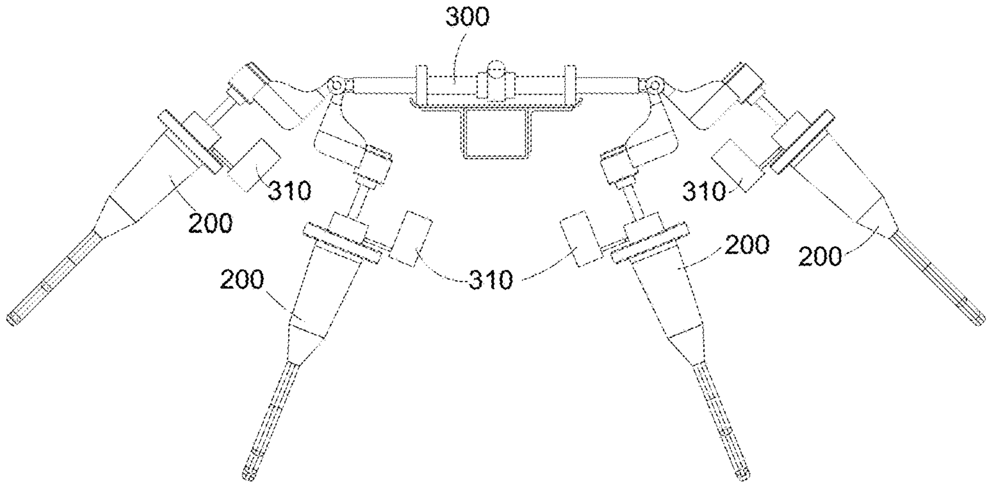
FIG. 5 is a structural diagram of spacing bars, a mold bracket, and glove molds.

In a first aspect, the present disclosure provides a glove spraying apparatus 100, as shown in FIGS. 1 and 2, including a first liquid container 110, a plurality of universal pipelines, and a plurality of nozzles 131 and 132; the first liquid container 110 communicates with first ends of universal pipelines 121 and 122 through a pipeline 400"; the nozzles 131 and 132 are fluidly connected to second ends of the universal pipelines 121 and 122. Specifically, the glove spraying apparatus 100 includes five universal pipelines, including two linear universal pipelines 121 and three Y-shaped universal pipelines 122. As shown in FIGS. 3 and 4, the linear universal pipeline 121 includes one first end 121A and one second end 121B. The first end 121A of the linear universal pipeline 121 communicates with the first liquid container 110; and the second end 121B of the linear universal pipeline 121 communicates with a nozzle (the first nozzle 131 or the second nozzle 132). The Y-shaped universal pipeline 122 includes one first end 122A and two second ends 122B; the first end 122A of the Y-shaped universal pipeline 122 communicates with the first liquid container 110; and the two second ends 122B of the Y-shaped universal pipeline 122 communicate with the first nozzle 131 and the second nozzle 132, respectively. The spraying liquid flows through the first end 122A of the Y-shaped universal pipeline 122, and then the two second ends 122B of the Y-shaped universal pipeline 122. Thus, there are eight second ends 121B, 122B of the universal pipelines and five first ends 121A, 122A of the universal pipelines. At the same time, the eight second ends of the universal pipelines are provided with respective nozzles (namely, a total of eight nozzles).

In the above solution, the user may control the orientations and positions of the nozzles 131 and 132 by bending and twisting the universal pipelines to spray various regions of the glove. Specifically, when it is desired to spray the spraying liquid onto the fingertip portion of the glove, the user may move the nozzles 131 and 132 to the fingertip portion and regulate the size of the spraying spot by regulating the distance of the nozzles 131 and 132 from the fingertip portion.

In some other embodiments, the number of universal pipelines and nozzles is not limited to the above embodiments, and may be 1, 2, 3, or more, which may be adjusted by the skill in the art according to circumstances. For example, in some embodiments, there is only one linear universal pipeline 121 with one nozzle.

The first ends of the universal pipelines 121 and 122 are provided with flow regulating valves 140; each of the flow regulating valves 140 has a liquid inlet 141, a gas inlet 142, and a regulating valve outlet 143; the gas inlet 142 is configured to inhale gas, the liquid inlet 141 communicates with the first liquid container 110, and the regulating valve outlet 143 communicates with the universal pipelines; the gas and the spraying liquid are mixed in the flow regulating valves 140, and the flow regulating valves 140 can adjust flows of the spraying liquid and the gas. Specifically, the flow regulating valve 140 include a regulating screw 144, and the gas flow and the spraying liquid flow may be regulated by rotating the regulating screw 144. Therefore, the user may adjust the mixing ratio of the gas and the spraying liquid through the flow regulating valves 140 to adjust the atomization effect, and further to form a unique coating for different products. It is emphasized that the spraying liquid may be hyaluronic acid, an essence solution, an aloe liquid dissolved with aloe extract, and the like.

In some embodiments, the spraying liquid is delivered to the flow regulating valves 140 by delivering compressed gas to the flow regulating valves 140 to form a siphon. In some embodiments, the user may place the first liquid container 110 above the flow regulating valves 140 to deliver the spraying liquid in the first liquid container 110 by gravity. The spraying liquid in the first liquid container 110 is delivered to the flow regulating valves 140 in various ways, and therefore, it is not specifically defined herein.

Optionally, a second filter 600 is provided between the first liquid container 110 and the flow regulating valves 140; the second filter 600 is used for filtering the spraying liquid delivered from the first liquid container 110 to the flow regulating valves 140. Specifically, the first liquid container 110 communicates with the flow regulating valves 140 through the pipeline 400"; the second filter 600 is disposed within the pipeline 400".

Optionally, the glove spraying apparatus 100 includes recycling containers 150; the recycling containers 150 are positioned under or beneath the nozzles 131 and 132 to recycle the spraying liquid; and the recycling containers 150 communicate with the first liquid container 110. Specifically, the recycling containers 150 are recycling boxes with upper openings. The spraying liquid sprayed from the nozzles 131 and 132 or the spraying liquid discharged from the glove mold 200 may flow into the recycling containers 150 for recycling. The spraying liquid collected in the recycling containers 150 may flow to the first liquid container 110 through the pipeline 400. Optionally, a first filter 500 is provided in the first liquid container 110; and the spraying liquid in the first liquid container 110 is filtered by the first filter 500. Since contaminants such as dust may exist in the factory, it is necessary to filter the recycled spraying liquid to remove excessive impurities in the recycled spraying liquid. The first filter may optionally be a multi-layer filter, each layer is provided with sieve openings of different sizes for sieve filtration.

It should be noted that the linear universal pipelines 121 and the Y-shaped universal pipelines 122 pertain to the universal pipelines; the first ends 121A of the linear universal pipelines 121 and the first ends 122A of the Y-shaped universal pipelines 122 both pertain to the first ends of the universal pipelines; and the second ends 121B of the linear universal pipelines 121 and the second ends 122B of the Y-shaped universal pipelines 122 both pertain to the second ends of the universal pipelines.

Optionally, the glove spraying apparatus 100 includes a liquid level sensor 111 for sensing the liquid level of the first liquid container 110. The liquid level sensor 111 may be an ultrasonic ranging sensor, a contact-type float switch sensor, or the like. The liquid level of the first liquid container 110 is measured by the liquid level sensor 111 in order to replenish the first liquid container 110 with the spraying liquid at any time.

Optionally, a second liquid container 160 and a pump body 161 are provided, and the pump body 161 transfers the spraying liquid in the second liquid container 160 to the first liquid container 110. The pump body 161 may be a diaphragm pump, a peristaltic pump, a volumetric pump, or the like, which delivers the spraying liquid.

Optionally, a valve 162 is provided in the pipeline 400' leading from the second liquid container 160 to the first liquid container 110. The user may regulate the amount of the second liquid container 160 delivered to the first liquid container 110 by regulating the opening degree of the valve 162.

Optionally, the temperature of the spraying liquid in the second liquid container 160 is 30° C. or less. In order to facilitate transport and recovery, the first liquid container 110 is mostly placed close to the nozzles 131 and 132 where the temperature is relatively high. Thus, in some alternative embodiments, room temperature can be achieved by placing the second liquid container 160 which stores the spraying liquid in bulk at a lower temperature location, such as a place remote from the nozzles or the entire spraying system. In addition, specialized cooling equipment may also be provided in some embodiments for cooling to ensure that the spraying liquid does not deteriorate in a relatively high-temperature state for a long time.

In a second aspect, the present disclosure provides a glove spraying system, including at least one glove mold 200, and a glove spraying apparatus 100 for spraying a glove on the glove mold 200. Normally, the glove mold 200 is filled with gloves before the glove mold 200 is transferred to the glove spraying apparatus 100. When the glove mold 200 is transferred to the glove spraying apparatus 100, the glove spraying apparatus 100 serves to spray the glove on the glove mold 200 to form a coating layer on the glove. While the glove mold 200 may be placed on the mold bracket 300, the glove mold 200 is moved together by moving the mold bracket 300. It should be noted that the glove mold 200 has a shape that conforms to a hand, having a finger portion, a palm portion, and the like.

Optionally, the nozzles include first nozzles 131 for spraying the front side of the glove on the glove mold 200 and second nozzles 132 for spraying the back side of the glove on the glove mold 200. With the above arrangement, the glove spraying apparatus 100 may spray the front side (palm side) and the back side (backhand side) of the glove on the glove mold 200, ensuring complete coverage of the glove. It should be noted that the position and arrangement of the nozzles may be adjusted according to circumstances, and the first nozzles 131 and the second nozzles 132 are not necessarily both included. As in some embodiments, only the first nozzles 131 are included, or only the second nozzles 132 are included.

Optionally, the nozzles are atomizing nozzles. Thus, in some alternative embodiments, the first nozzles 131 and the second nozzles 132 are atomizing nozzles. The atomizing nozzles primarily allow for more uniform mixing of the spraying liquid.

Optionally, the glove spraying system includes a plurality of sets of glove molds 200, the glove molds 200 in each set of glove molds 200 are arranged in parallel, and the glove molds 200 in adjacent sets are in a splayed arrangement. The adjacent sets of glove molds 200 have a splayed arrangement, meaning that the adjacent sets of glove molds 200 extend at an angle (approximately 10 to 80 degrees) from the wrist to the fingertip. For example, the distance between the wrists of adjacent sets of glove molds 200 is less than the distance between the fingertips of adjacent sets of glove molds 200. By forming a certain angle between the glove molds 200, the gap between the two adjacent molds can ensure that the universal pipelines and nozzles can be put in. In some optional embodiments, the position of the spacing glove mold 200 is supported by the placement of spacing bars 310, as shown in FIG. 1.

In some embodiments, the glove spraying apparatus 100 further includes a mounting bracket 170 to which the universal pipelines and flow regulating valves 140 may be mounted for subsequent overall adjustment of the positions of the universal pipelines and flow regulating valves 140.

Typically, the spraying liquid is stored in the second liquid container 160 and is kept at low temperature. When spraying is required, the pump body 161 and the valve 162 are opened to transfer the spraying liquid from the second liquid container 160 to the first liquid container 110. The user may then open the flow regulating valves 140 and deliver compressed air to the flow regulating valves 140, creating a siphon as the compressed air passes through the flow regulating valves 140, thereby delivering the spraying liquid in the first liquid container 110 to the flow regulating valves 140. After the spraying liquid is mixed with the compressed air in the flow regulating valves 140, it can be delivered to the atomizing nozzles through the universal pipelines and sprayed by the nozzles onto the glove positioned on the glove mold 200 to form a coating layer on the glove. It should be noted that it is normally necessary to adjust the position of the nozzles prior to spraying to avoid readjustment during production.

In the above solutions, firstly, the spraying liquid is atomized by a nozzle to form a more uniform coating. Secondly, the user may adjust the position of spraying through the universal pipelines according to the situation, to better adapt to different product requirements. In addition, the recycling containers 150 and the first filter 500 recycle and filter the sprayed spraying liquid to ensure the utilization rate and purity of the spraying liquid. Further, by storing the spraying liquid in the second liquid container 160 in a relatively low-temperature environment, the spraying liquid is prevented from deteriorating.

In a third aspect, the present disclosure further provides a glove spraying apparatus 100, as shown in FIGS. 1 and 2, including a first liquid container 110, nozzles 131 and 132, recycling containers 150, and a first filter 500. The first liquid container 110 communicates with the nozzles 131 and 132; the recycling containers 150 are located under or beneath the nozzles to recycle spraying liquid; the recycling containers 150 communicate with the first liquid container 110; the first filter 500 is located inside the first liquid container 110; the first filter 500 is used for filtering the spraying liquid inside the first liquid container 110. Specifically, the recycling containers 150 are recycling boxes with upper openings. The spraying liquid sprayed from the nozzles or the spraying liquid discharged from the glove mold 200 may flow into the recycling containers 150 for recycling. The spraying liquid collected in the recycling containers 150 may flow to the first liquid container 110 through the pipeline 400 and be filtered by the first filter 500. The first filter may be selected as a multi-layer filter, each layer is provided with sieve holes of different sizes for sieve filtration.

It should be noted that in the embodiments of the third and fourth aspects, the first liquid container 110 may be connected to the nozzles 131 and 132 via universal pipelines or other types of pipelines (for example, non-deformable pipelines).

Optionally, flow regulating valves 140 are provided between the first liquid container 110 and the nozzles 131 and 132; each of the flow regulating valves 140 has a liquid inlet 141, a gas inlet 142, and a regulating valve outlet 143; the gas inlet 142 is configured to inhale gas, the liquid inlet 141 communicates with the first liquid container 110, and the regulating valve outlet 143 communicates with the universal pipelines; the gas and the spraying liquid are mixed in the flow regulating valves 140, and the flow regulating valves 140 are used for regulating the flows of the spraying liquid and the gas. As described in the first aspect, the spraying liquid in the first liquid container 110 is delivered to the flow regulating valves 140 in various ways, and it is not specifically defined herein. It is emphasized that the spraying liquid may be hyaluronic acid, an essence solution, an aloe liquid dissolved with aloe extract, and the like.

Optionally, a second filter 600 is provided between the first liquid container 110 and the flow regulating valves 140; the second filter 600 is used for filtering the spraying liquid delivered from the first liquid container 110 to the flow regulating valves 140. Specifically, the first liquid container 110 communicates with the flow regulating valves 140 through the pipeline 400"; the second filter 600 is disposed within the pipeline 400".

Optionally, the glove spraying apparatus 100 includes a second liquid container 160 and a pump body 161; the pump body 161 transfers the spraying liquid in the second liquid container 160 to the first liquid container 110. The pump body 161 may be a diaphragm pump, a peristaltic pump, a volumetric pump, or the like, which delivers the spraying liquid.

Optionally, a valve 162 is provided in the pipeline 400' leading from the second liquid container 160 to the first liquid container 110. The user may regulate the amount of the second liquid container 160 delivered to the first liquid container 110 by regulating the opening degree of the valve 162.

Optionally, the temperature of the spraying liquid in the second liquid container 160 is 30° C. or less.

Optionally, the glove spraying apparatus 100 includes a plurality of nozzles.

In a fourth aspect, the present disclosure further provides a glove spraying system, including at least one glove mold 200, and a glove spraying apparatus 100 for spraying a glove on the glove mold 200. Normally, the glove mold 200 is filled with gloves before the glove mold 200 is transferred to the glove spraying apparatus 100. When the glove mold 200 is transferred to the glove spraying apparatus 100, the glove spraying apparatus 100 serves to spray the glove on the glove mold 200 to form a coating layer on the glove. While the glove mold 200 may be placed on the mold bracket 300; the glove mold 200 is moved together by moving the mold bracket 300.

It should be noted that the glove mold 200 has a shape that conforms to a hand, with a finger portion, a palm portion, and the like.

Optionally, the nozzles include first nozzles 131 for spraying the front side (palm side) of the glove on the glove mold 200 and second nozzles 132 for spraying the back side (backhand side) of the glove on the glove mold 200. It should be noted that the position and arrangement of the nozzles may be adjusted according to circumstances, and the first nozzles 131 and the second nozzles 132 are not necessarily both included. As in some embodiments, only the first nozzles 131 are included, or only the second nozzles 132 are included.

Optionally, the nozzles are atomizing nozzles. Thus, in some alternative embodiments, the first nozzles 131 and the second nozzles 132 are atomizing nozzles.

Optionally, the glove spraying system includes a plurality of sets of glove molds 200, the glove molds 200 in each set of glove molds 200 are arranged in parallel, and the glove molds 200 in adjacent sets are in a splayed arrangement. The adjacent sets of glove molds 200 have a splayed arrangement, meaning that the adjacent sets of glove molds 200 extend at an angle (approximately 10 to 80 degrees) from the wrist to the fingertip. The distance between the wrists of adjacent sets of glove molds 200 is less than the distance between the fingertips of adjacent sets of glove molds 200. By forming a certain angle between the glove molds 200, the gap between the two molds can ensure that the universal pipelines and nozzles can be put in. It is noted that in some embodiments, as shown in FIG. 1, the position of the spacing glove mold 200 is supported by the placement of spacing bars 310.

It should be noted that the glove spraying system normally includes a production line; the mold bracket 300 may be actuated by a driving apparatus on the production line, thereby moving the mold bracket 300 and the glove mold 200 on the mold bracket 300 together. While spacing guide sleeves are provided on the production line to restrict the position of the glove mold 200, so that the glove mold 200 and glove molds 200 in adjacent groups are in a splayed arrangement.

In some embodiments, the glove spraying apparatus 100 further includes a mounting bracket 170 to which the universal pipelines and flow regulating valves 140 may be mounted for subsequent overall adjustment of the positions of the universal pipelines and flow regulating valves 140.

Figure 6:
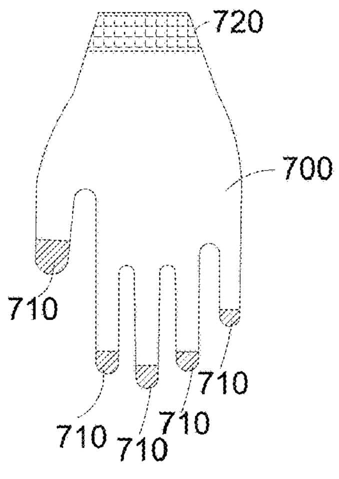
FIG. 6 is a structural diagram of a glove in one embodiment of the present disclosure.

In a fifth aspect, the present disclosure provides a glove 700, as shown in FIG. 6; a first coating 710 is formed on the glove 700, the first coating 710 does not completely cover an interior surface of the glove 700. It should be noted that the first coating 710 may be disposed on the palm of the glove, on the fingertip, and/or on the wrist, and it is not specifically defined herein.

Optionally, a second coating 720 is formed on the glove 700, the second coating 720 is disposed on a region of the interior surface of the glove not covered by the first coating 710. The positions not covered by the first coating layer 710 are sprayed by the second coating layer 720, to produce different effects. Taking FIG. 6 as an example, the first coating 710 covers the fingertips of the interior surface of the glove, and the second coating 720 covers the wrist region of the interior surface of the glove.

It should be noted that the materials of the first coating layer 710 and the second coating layer 720 are different.

The technical means disclosed in the solutions of the present disclosure are not limited to the technical means disclosed in the above embodiments, but also include technical solutions consisting of any combination of the above technical features. It should be noted that for those ordinarily skilled in the art, several improvements and refinements may be further made without deviating from the principle of the present disclosure, which should also be considered within the protection scope of the present disclosure.

What is claimed is:

1. A glove spraying apparatus comprising a first liquid container, universal pipes, recycling containers, and nozzles, wherein;

the nozzles are fluidly connected to respective second ends of the universal pipes;

first ends of the universal pipes are provided with flow regulating valves each having a liquid inlet;

each of the liquid inlets communicates with the first liquid container;

the recycling containers are configured to recycle a spraying liquid and communicate with the first liquid container;

the flow regulating valves are used for adjusting flows of the spraying liquid; and the first liquid container is provided with a first filter for filtering the spraying liquid in the first liquid container, wherein:

the glove spraying apparatus further comprises a second liquid container and a pump body transferring the spraying liquid in the second liquid container to the first liquid container; and the spraying liquid has a temperature of 30° C. or less while in the second liquid container.

2. The glove spraying apparatus according to claim 1, wherein each of the flow regulating valves has a gas inlet and a regulating valve outlet; the gas inlets are configured to inhale a gas, and the regulating valve outlets communicate with the universal pipes; the gas and the spraying liquid are mixed in the flow regulating valves; and the flow regulating valves are used for adjusting flows of the spraying liquid and the gas.

3. The glove spraying apparatus according to claim 1, wherein the recycling containers are located under or beneath the nozzles to recycle the spraying liquid.

4. The glove spraying apparatus according to claim 1, wherein the nozzles are atomizing nozzles.

5. The glove spraying apparatus according to claim 1, wherein a number of the nozzles corresponds to a number of the second ends of the universal pipes.

6. The glove spraying apparatus according to claim 5, wherein a plurality of universal pipes comprises Y-shaped universal pipes and linear universal pipes, wherein:

each of the Y-shaped universal pipes comprises one of the first ends and two of the second ends;

the first end of each of the Y-shaped universal pipes communicates with the first liquid container;

each of the two second ends of each of the Y-shaped universal pipes communicates with the nozzles, respectively;

each of the linear universal pipes comprises one of the first ends and one of the second ends;

the first end of each of the linear universal pipes communicates with the first liquid container; and the second end of each of the linear universal pipes communicates with one of the nozzles.

7. A glove spraying system comprising at least one glove mold and the glove spraying apparatus according to claim 1, wherein the glove spraying apparatus is used for spraying a glove on the at least one glove mold.

8. The glove spraying system according to claim 7, wherein the nozzles comprise first nozzles for spraying a front side of the glove on the at least one glove mold and second nozzles for spraying a back side of the glove on the at least one glove mold.

9. The glove spraying system according to claim 8, wherein the at least one glove mold is arranged in sets, each set of the at least one glove mold is arranged in parallel, and adjacent sets are in a splayed arrangement.

10. A glove spraying apparatus comprising a first liquid container, nozzles, recycling containers, and a first filter, wherein the first liquid container communicates with the nozzles; the recycling containers are located under or beneath the nozzles to recycle a spraying liquid; the recycling containers communicate with the first liquid container; and the first liquid container is provided with the first filter for filtering the spraying liquid in the first liquid container, and further wherein flow regulating valves are provided between the first liquid container and the nozzles; each of the flow regulating valves has a liquid inlet, a gas inlet, and a regulating valve outlet; the gas inlet is configured to inhale a gas, the liquid inlet communicates with the first liquid container, and the regulating valve outlet communicates with universal pipes; the gas and the spraying liquid are mixed in the flow regulating valves; and the flow regulating valves are used for adjusting flows of the spraying liquid and the gas.

11. The glove spraying apparatus according to claim 10, further comprising a second liquid container and a pump body transferring the spraying liquid in the second liquid container to the first liquid container.

12. The glove spraying apparatus according to claim 11, wherein the spraying liquid is has a temperature of 30° C. or less while in the second liquid container.

13. The glove spraying apparatus according to claim 10, wherein the nozzles are atomizing nozzles.

14. A glove spraying system comprising at least one glove mold and the glove spraying apparatus according to claim 13, wherein the glove spraying apparatus is used for spraying a glove on the at least one glove mold.

15. The glove spraying system according to claim 14, wherein the nozzles comprise first nozzles for spraying a front side of the glove on the at least one glove mold and second nozzles for spraying a back side of the glove on the at least one glove mold.

16. The glove spraying system according to claim 14, wherein the at least one glove mold is arranged in sets, each set of the at least one glove mold is arranged in parallel, and adjacent sets are in a splayed arrangement.

* * * * *